United States Patent
Etori (10) Patent No.: US 8,449,151 B2
(45) Date of Patent: May 28, 2013

(54) LIGHT CONTROL FILM, BACKLIGHT DEVICE USING THE SAME, AND METHOD FOR MANUFACTURING MOLD FOR FORMING UNEVEN PATTERN

(75) Inventor: Hideki Etori, Saitama (JP)

(73) Assignee: Kimoto Co., Ltd., Tokyo (JP)

( * ) Notice: Subject to any disclaimer, the term of this patent is extended or adjusted under 35 U.S.C. 154(b) by 359 days.

(21) Appl. No.: 12/933,877

(22) PCT Filed: Mar. 10, 2009

(86) PCT No.: PCT/JP2009/054523
§ 371 (c)(1),
(2), (4) Date: Sep. 21, 2010

(87) PCT Pub. No.: WO2009/116429
PCT Pub. Date: Sep. 24, 2009

(65) Prior Publication Data
US 2011/0026272 A1    Feb. 3, 2011

(30) Foreign Application Priority Data
Mar. 21, 2008    (JP) .................................. 2008-073507

(51) Int. Cl.
*F21V 5/00*    (2006.01)
(52) U.S. Cl.
USPC ............................. 362/336; 362/333; 362/620
(58) Field of Classification Search
USPC ............... 362/97.1–97.4, 222, 223, 308, 309, 362/311.01, 326, 328, 330, 333, 336, 551, 362/561, 606–608, 610–620, 800, 812; 349/57, 349/58, 62, 64, 65, 69, 70; 40/541, 546, 564, 40/565
See application file for complete search history.

(56) References Cited

U.S. PATENT DOCUMENTS

| | | | | |
|---|---|---|---|---|
| 4,924,356 A | * | 5/1990 | French et al. | 362/607 |
| 5,598,280 A | * | 1/1997 | Nishio et al. | 349/57 |
| 5,886,759 A | * | 3/1999 | Mashino et al. | 349/65 |

(Continued)

FOREIGN PATENT DOCUMENTS

| | | |
|---|---|---|
| JP | 2003-270412 A | 9/2003 |
| JP | 2004-33811 A | 2/2004 |
| JP | 2004-145328 A | 5/2004 |

OTHER PUBLICATIONS

International Search Report for PCT/JP2009/054523 dated Jun. 16, 2009.

*Primary Examiner* — Hargobind S Sawhney
(74) *Attorney, Agent, or Firm* — Kenealy Vaidya LLP (57) ABSTRACT

The present invention provides a light control film that can prevent generation of a moiré pattern when it is superimposed on another member having a regular structure while securing sufficient front luminance, and a backlight device using the same. The light control film of the present invention has a light control layer provided with an uneven pattern on a surface, and in this uneven pattern, a plurality of convexes having circular bases of approximately the same diameters are arranged so that the bases thereof should not overlap with one another and each should touch one or two or more other bases, and ratio of convexes arranged so that each of circular bases thereof should touch both bases of two convexes of which bases touch each other is controlled to be 50 to 92% among the total convexes arranged. The backlight device of the present invention is a backlight device incorporated with the aforementioned light control film.

13 Claims, 4 Drawing Sheets

U.S. PATENT DOCUMENTS

| | | | |
|---|---|---|---|
| 7,344,282 B2 * | 3/2008 | Kim et al. | 362/335 |
| 7,416,309 B2 * | 8/2008 | Ko et al. | 362/19 |
| 7,572,483 B2 * | 8/2009 | Hasei | 427/162 |
| 2003/0169504 A1 | 9/2003 | Kaminsky et al. | |
| 2003/0184993 A1 * | 10/2003 | Yamada | 362/31 |
| 2008/0180598 A1 * | 7/2008 | Kim et al. | 349/64 |

* cited by examiner

LIGHT CONTROL FILM, BACKLIGHT DEVICE USING THE SAME, AND METHOD FOR MANUFACTURING MOLD FOR FORMING UNEVEN PATTERN

This application is a U.S. national phase filing under 35 U.S.C. §371 of PCT Application No. PCT/JP2009/054523, filed Mar. 10, 2009, and claims priority under 35 U.S.C. §119 to Japanese patent application no. 2008-073507, filed Mar. 21, 2008, the entireties of both of which are incorporated herein by reference.

TECHNICAL FIELD

The present invention relates to a light control film used for backlight devices such as those for liquid crystal displays, illuminations, and so forth, and a backlight device using the same.

BACKGROUND ART

As light sources of liquid crystal displays, backlight devices of the edge light type or direct type are conventionally used. Since backlight devices of the edge light type themselves can be manufactured with a small thickness, they are used for notebook computers etc., whereas backlight devices of the direct type are frequently used for large-sized liquid crystal televisions etc.

Lights projected from these backlight devices contain components projected along directions inclined from the front direction. Lights projected from backlight devices of the edge light type, in particular, contain a lot of components projected along directions significantly inclined from the front direction, and thus it is difficult to obtain high front luminance.

Therefore, in order to direct lights projected at an angle with respect to the front direction to the front direction to improve front luminance, a light control film for condensing lights from a backlight device is incorporated.

For example, a prism sheet is conventionally used as one of the light control films that can achieve such an aspect. The prism sheet has a fine regular structure having a size of about several tens of micrometers, and although it shows high light condensing property, it generates glare, and suffers from a problem that, when it is incorporated into a backlight device, a moiré pattern occurs between the prism sheet and pixels of liquid crystal panel to degrade image quality. Therefore, by placing a light-diffusing film on the prism sheet, generations of glare of light source and moiré pattern are suppressed. However, if a light-diffusing film is placed, front luminance is reduced, and there also arises a problem that the number of parts increases.

As a light control film different from the prism sheet, there is a light control film having uneven profile formed on the surface thereof, which can improve luminance of a backlight device for the front direction, and enable uniform projection of lights from the backlight device.

In order to direct lights to the front direction as much as possible, the light control film of this type is preferably provided with an uneven pattern consisting of convexes arranged on the surface of the light control film without gaps, which convexes are suitable for improving property of condensing lights to the front direction of the backlight device. As such convexes for improving light-condensing property, for example, fine convexes having approximately circular bases are proposed in Patent document 1. Such convexes are formed by, for example, photolithography method, printing method, or the like (Patent documents 1 and 2).

When fine convexes having approximately circular bases are formed by photolithography, the convexes are preferably those having bases of approximately the same diameters for forming specific shapes showing high light-condensing property by one process. The best way for enhancing front luminance with such convexes is the closest packing of the convexes wherein the convexes are arranged without overlaps and gaps. However, such an arrangement constitutes a regular structure as in the example of the prism sheet mentioned above.

If a light control film having such a regular structure is incorporated into a backlight device, there arises a problem that a moiré pattern occurs between the film and a member having a regular structure such as pixels of a liquid crystal panel to degrade image quality, although it improves front luminance.

In order to prevent such generation of a moiré pattern, an uneven pattern in which convexes having bases of substantially the same diameters are arranged without regularity is required. However, for example, if convexes are randomly arranged by using random numbers or the like so that the convexes should not overlap with one another, the ratio of the bases of the convexes (packing ratio) is about fifty-odd percents at most. In this case, although the problem of the moiré pattern can be actually solved, the packing ratio of the convexes of the uneven pattern is extremely lower than the packing ratio of the closest packing (hexagonal arrangement), 90.7%. Therefore, the light-condensing property for the front direction is markedly reduced, and if such a pattern is used for a member of a backlight device, the front luminance of the backlight device becomes low.

In order to prevent generation of a moiré pattern, such a design is also possible that an uneven pattern constituted by convexes regularly arranged as the closest packing is used with a light-diffusing film separately incorporated into a backlight device. Although the generation of a moiré pattern can actually be prevented by this method, lights directed to the front direction are diffused with the light-diffusing film, and thus front luminance is reduced. Moreover, it increases the number of parts constituting the backlight device at the same time, and thus it is not an effective means.

Patent document 1: Japanese Patent Unexamined Publication (KOKAI) No. 2004-33811 (Modes for Carrying out the Invention)

Patent document 2: Japanese Patent Unexamined Publication No. 2003-270412 (Related Art)

DISCLOSURE OF THE INVENTION

Aspect to be Achieved by the Invention

Therefore, an aspect of the present invention is to provide a light control film that can prevent generation of a moiré pattern to be generated when the light control film is superimposed on another member having a regular structure, while sufficiently maintaining front luminance, and a backlight device using it.

Means for Achieving the Aspect

The inventor of the present invention found that, concerning the aforementioned aspect, a light control film that could prevent generation of a moiré pattern to be generated when the light control film was superimposed on another member having a regular structure with sufficiently maintaining front luminance can be obtained with an uneven pattern designed by using an original method for packing convexes, and accomplished the present invention.

That is, the light control film of the present invention comprises a light control layer having an uneven pattern in which convexes having circular bases of approximately the same diameters are arranged on a surface, wherein the uneven pattern has such an arrangement, for first to n-th convexes (n is an integer of 2 or larger) successively arranged, that circular base of the n-th convex (n is an integer of 2 or larger) should touch any of circular bases of the first to (n−1)th convexes without overlapping with the circular bases of all the first to (n−1)th convexes, and ratio of convexes arranged so that each of circular bases thereof should touch both circular bases of two convexes of which circular bases touch each other is 50 to 92% among the convexes.

The light control film of the present invention is also a light control film having a light control layer provided with an uneven pattern in which a plurality of convexes having circular bases of approximately the same diameters are arranged on a surface, wherein a plurality of the convexes are arranged so that the circular bases should not overlap with one another, each circular base should touch one or more other circular bases, and ratio of convexes arranged so that each of the circular bases thereof should touch circular bases of two or more convexes is 80% or more and less than 100% among a plurality of the convexes.

Alternatively, the ratio of convexes arranged so that each of circular bases thereof should touch circular bases of two or more convexes is 80% or more and 100% or less among a plurality of the convexes, provided that the uneven pattern does not contain regular arrangement. The regular arrangement means an arrangement where a unit formed by any two or more convexes repeats for any direction.

In the light control film of the present invention, the convexes preferably have approximately the same shapes.

Further, in the light control film of the present invention, packing ratio of the circular bases of the convexes in the uneven pattern is preferably 70 to 82%.

Furthermore, in the light control film of the present invention, the convexes preferably have an aspect ratio of 0.40 to 0.70.

Furthermore, in the light control film of the present invention, the light control layer is preferably constituted with a polymer resin.

The backlight device of the present invention is a backlight device comprising a light source, a plate-shaped optical member for projecting light entered from the light source from a surface other than a light-entering surface, and a light control film disposed adjacent to the plate-shaped optical member, wherein the light control film of the present invention is used as the light control film.

The plate-shaped optical member is, for example, a light guide panel provided with a light source disposed along at least one end of the light guide panel, of which surface approximately perpendicular to the one end serves as a light-projecting surface, and the light control film is disposed on the light-projecting surface of the light guide panel. Alternatively, the plate-shaped optical member is a light-diffusing panel disposed on one side of the light source, and the light control film is disposed on the side of the light-diffusing panel opposite to the side of the light source.

Effect of the Invention

Since the light control film of the present invention comprises a light control layer having an uneven pattern formed by packing convexes having approximately the same diameters, which can enhance light-condensing property, by the original packing method, and not having regularity on the surface, it can prevent generation of a moiré pattern even when the light control film is superimposed on another member having a regular structure, while sufficiently maintaining front luminance.

Moreover, since the backlight device of the present invention using such a light control film of the present invention shows high front luminance, and does not generate a moiré pattern even when it is used with a liquid crystal panel having a regular structure in combination, it can have a structure not degrading image quality and not increasing number of parts.

BEST MODE FOR CARRYING OUT THE INVENTION

Hereafter, embodiments of the light control film of the present invention will be explained.

The light control film of the present invention comprises a light control layer having an uneven pattern on the surface, and is characterized in the arrangement of a plurality of convexes constituting the uneven pattern of the light control layer. Light enters from the side of the bases of the convexes, and is projected from the side of the uneven pattern (front direction when it is incorporated into a backlight device). Although the shape and arrangement of the convexes will be explained later in more detail, a plurality of the convexes have circular bases of approximately the same diameters, and they are arranged so that the circular bases should not overlap with one another, and each circular base should touch circular base or bases of one or more other convexes. The ratio of convexes arranged so that each of circular bases thereof should touch both circular bases of two convexes of which circular bases touch each other is 50 to 92% among a plurality of the convexes. Alternatively, the ratio of convexes arranged so that each of circular bases thereof should touch circular bases of two or more convexes is 80% or more and less than 100%. With these arrangements, the packing ratio of the convexes can be increased compared with usual random arrangements, and generation of a moiré pattern originating in a regular arrangement can also be prevented.

The structure of the light control film of the present invention is not limited to one consisting of a single light control layer having an uneven pattern on the surface, and it may be one comprising a support and the light control layer laminated on the support.

The light control layer of the present invention is mainly constituted with a polymer resin. Examples of the polymer resin include ionizing radiation curable resins, thermosetting resins, thermoplastic resins, and so forth.

The light control layer is preferably constituted only with the polymer resin without using microparticles and so forth for suppressing scattering of light resulting from difference of refractive indexes of substances constituting the light control layer, and for obtaining favorable light-condensing property for the front direction.

As the ionizing radiation curable resins, photopolymerizable prepolymers that can be cured by crosslinking caused by irradiation of ionizing radiation (ultraviolet ray or electron beam) can be used. As such photopolymerizable prepolymers, acrylic type prepolymers that have two or more acryloyl groups in the molecule and form a three-dimensional reticular structure by crosslinking curing are especially preferably used. As such acrylic type prepolymers, urethane acrylates, polyester acrylates, epoxy acrylates, melamine acrylates, polyfluoroalkyl acrylates, silicone acrylates, and so forth can be used. Although these acrylic type prepolymers can be used independently, photopolymerizable monomers are preferably added in order to improve crosslinking curable property and further improve hardness of the light control layer.

As the photopolymerizable monomers, there are used one or two or more kinds of monomers among monofunctional acrylic monomers such as 2-ethylhexyl acrylate, 2-hydroxyethyl acrylate, 2-hydroxypropyl acrylate and butoxyethyl acrylate, bifunctional acrylic monomers such as 1,6-hexanediol diacrylate, neopentylglycol diacrylate, diethylene glycol diacrylate, polyethylene glycol diacrylate and hydroxypivalic acid ester neopentylglycol diacrylate, polyfunctional acrylic monomers such as dipentaerythritol hexaacrylate, trimethylpropane triacrylate and pentaerythritol triacrylate, and so forth.

When the light control layer is cured by ultraviolet irradiation, it is preferable to use additives such as photopolymerization initiators and photopolymerization enhancers, besides the photopolymerizable prepolymers and photopolymerizable monomers mentioned above.

Examples of the photopolymerization initiators include acetophenone, benzophenone, Michler's ketone, benzoin, benzyl methyl ketal, benzoyl benzoate, α-acyl oxime ester, thioxanthones, and so forth.

The photopolymerization enhancers can accelerate the curing rate by reducing polymerization disturbance caused by oxygen at the time of curing, and examples include p-dimethylaminobenzoic acid isoamyl ester, p-dimethylaminobenzoic acid ethyl ester, and so forth.

Examples of the thermosetting resins include silicone resins, phenol resins, urea resins, melamine resins, furan resins, unsaturated polyester resins, epoxy resins, diallyl phthalate resins, guanamine resins, ketone resins, aminoalkyd resins, urethane resins, acrylic resins, polycarbonate resins, and so forth. Although they can be independently used, it is desirable to add a curing agent in order to further improve crosslinking property and hardness of coated film cured by crosslinking.

As the curing agent, those compounds including polyisocyanates, amino resins, epoxy resins, carboxylic acids and so forth can be suitably used according to the resin used.

Examples of the thermoplastic resins include ABS resins, norbornene resins, silicone resins, nylon resins, polyacetal resins, polycarbonate resins, modified polyphenylene ether resins, polybutylene terephthalates, polyethylene terephthalates, sulfone resins, imide resins, fluorocarbon resins, styrene resins, acrylic resins, vinyl chloride resins, vinyl acetate resins, vinyl chloride/vinyl acetate copolymer resins, polyester resins, urethane resins, nylon resins, rubber type resins, polyvinyl ethers, polyvinyl alcohols, polyvinylbutyrals, polyvinylpyrrolidones, polyethylene glycols, and so forth.

Among these thermosetting resins and thermoplastic resins, it is preferable to use an acrylic thermosetting resin or thermoplastic resin in view of the coated film strength and favorable transparency at the time of use as the light control layer. Moreover, these thermosetting resins and thermoplastic resins can also be used as a composite resin comprising suitably combined two or more kinds of thermosetting resins or two or more kinds of thermoplastic resins. In the light control layer, resins other than the resins mentioned above as the polymer resin can also be used together.

In addition, in such an extent that the effect of the present invention should not be degraded, the light control layer may contain, besides the polymer resin, various additives such as lubricants, optical whitening agents, microparticles, antistatic agents, flame retardants, antibacterial agents, antifungal agents, ultraviolet absorbers, light stabilizers, anti-oxidants, plasticizers, leveling agents, flow regulators, antifoams, dispersing agents, surface lubricant, and crosslinking agents.

The details of the uneven pattern provided on the surface of the light control layer are explained below.

As described above, in the uneven pattern of the light control layer according to the present invention, the convexes constituting it are arranged so that the circular bases thereof should not overlap with one another, and each circular base should touch circular base or bases of one or more other convexes. The ratio of convexes arranged so that each of circular bases thereof should touch both circular bases of two convexes of which circular bases touch each other is 50 to 92% among a plurality of the convexes.

If the ratio of the convexes arranged so that each of circular bases thereof should touch both circular bases of two convexes of which circular bases touch each other is 50% or higher, high front luminance can be secured. Further, by making the ratio 92% or smaller, regularity of the arrangement of the convexes is reduced, and thus generation of a moiré pattern can be favorably prevented even when it is superimposed on another member having a regular structure. Further, from the same point of view, the ratio is more preferably in the range of 70 to 90%.

Figure 1:
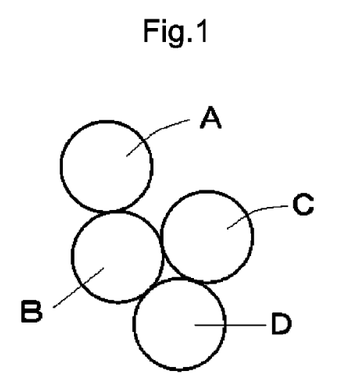
FIG. 1 is an explanatory view showing the ratio in the arrangement of the convexes of the uneven pattern according to the present invention.

The relation of the convexes of which ratio is defined above is further explained as follows. As shown in the explanatory view of FIG. 1, the circular bases B to D of convexes are in the relation that the convexes are arranged so that each of the circular bases of them touches both circular bases of two convexes of which circular bases touch each other (for example, viewing from the circular base B of a convex, it touches both circular bases C and D of two convexes of which circular bases touch each other). In contrast, since the circular base A of a convex is in a relation that it touches only the circular base B of a convex, it is not in the relation that the convexes are arranged so that each circular base thereof should touch both circular bases of two convexes of which circular bases touch each other. Therefore, for all the circular bases A to D of convexes, the aforementioned ratio is 75%.

When the convexes are arranged, it is preferable to arrange the convexes so that there should not remain spaces where the circular bases of approximately the same diameters can be further placed for further improving front luminance.

Figure 2:
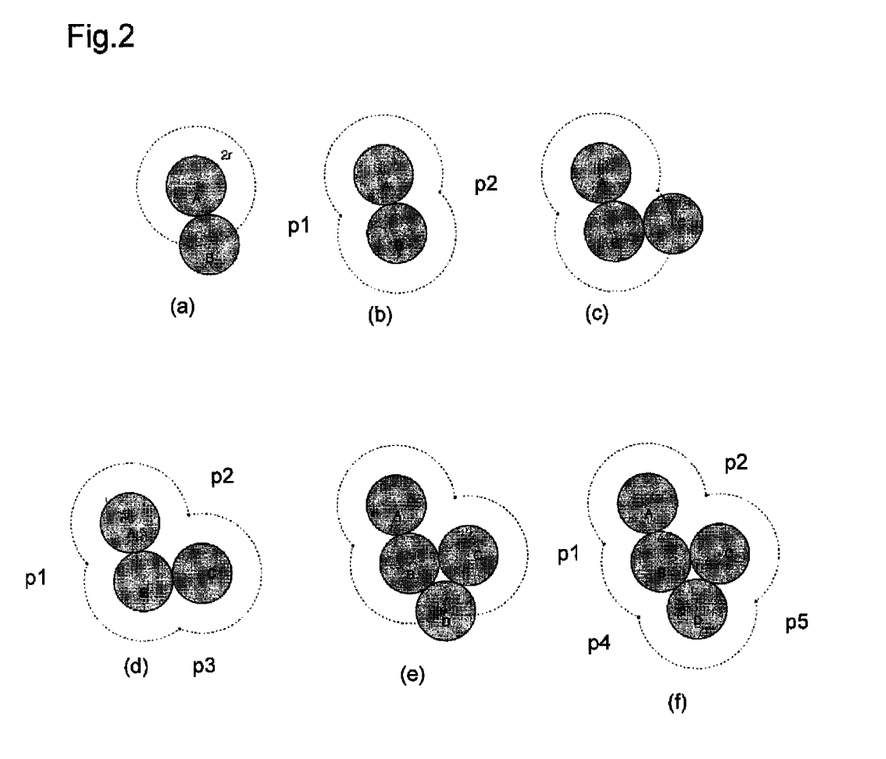
FIG. 2 is a drawing for explaining the method for arranging convexes in an uneven pattern according to the present invention.

The method for packing convexes for realizing the arrangement mentioned above will be explained with reference to FIG. 2. Since the bases of the convexes have a circular shape, it is explained as a method for arranging a plurality of circles on a plane. As shown in FIG. 2, (a), the circle A having a radius r is first arranged at an arbitrary position as the first circle. By arranging the second circle B so that the center thereof should be on a circle of a radius 2r having the center at the center of the circle A, which is indicated with the dotted line in FIG. 2, (a), the second circle B is arranged so as to touch the circle A without overlap with the circle A. The position on which the center of the third circle C is disposed so that the circle C should not overlap with the circles A and B, and touch either the circle A or the circle B is a position on the line shown with the dotted line in FIG. 2, (b). If the center of the circle C is arranged at either one of the two of the points p1 and p2, i.e., intersections of the circle of a radius 2r having the center thereof at the center of the circle A and the circle of a radius 2r having the center thereof at the center of the circle B, the circle C touch both the circles A and B. Then, if the circle C is arranged so that the center thereof should be at a point on the dotted line other than the intersections p as shown in FIG. 2, (c), the position at which the center of the fourth circle D is arranged so that the circle D should touch any one of the circles A, B and C is a position on the line shown with a dotted line in FIG. 2, (d). Three points, p1, p2, and p3 on the line are a position where the circle D touches with two or more circles if the center of the circle D is positioned. Then, if the circle D is arranged at the point p3 as shown in FIG. 2, (e), the point at which the center of the fifth circle can be arranged so that it should touch any one of the four circles are present on the line shown with a dotted line in FIG. 2, (f), and there are four points, p1, p2, p4, and p5, as positions at which the center of the fifth circle can be arranged so that the circle should touch two or more circles.

As described above, if one or more circles are arranged, the position at which the center of the next circle can be arranged so that the circle should touch any one of the circles is defined in the shape of a line, and on this line, a position at which the center of the next circle can be arranged so that the circle should touch two circles is defined as a point. Hereafter, this line is referred to as arrangement line, and the point is referred to as specific point.

In the packing method of the present invention, circles are arranged so that the centers thereof should be on arrangement lines defined by the arrangement of the circles packed until then, and in this arrangement, the ratio of circles of which center is arranged at a specific point is controlled. Such arrangement of circle is repeated until it becomes impossible to draw an arrangement line in an area in which circles are arranged. Circles can be thereby finally arranged on a desired plane without leaving spaces where a circle having the same diameter can be arranged, and all the circles are arranged so that they should not overlap with one another, and touch any one of the circles. Further, if circles are packed in a plane having a sufficiently wide area relative to the size of the circles, the ratio of the circles touching two or more circles eventually substantially corresponds to the ratio of circles arranged so that the centers thereof should be at the specific points.

Therefore, by controlling the ratio of circles arranged so that the centers thereof should be at the specific points, the ratio of circles touching two or more circles can be controlled. In the examples shown in FIG. 2, the specific point is defined as a position where a center of a circle touches two or more circles. However, it is also possible to define a specific point only as a position where a center of a circle touches both two circles touching each other. In such a case, in the example of FIG. 2, (d), only p1 and p3 are the specific points, and in the example of FIG. 2, (f), only p1, p4 and p5 are the specific points. The ratio of circles arranged so that centers thereof should be at the specific points determined as described above eventually substantially corresponds to the ratio of circles arranged so as to touch both two circles touching each other.

Figure 3:
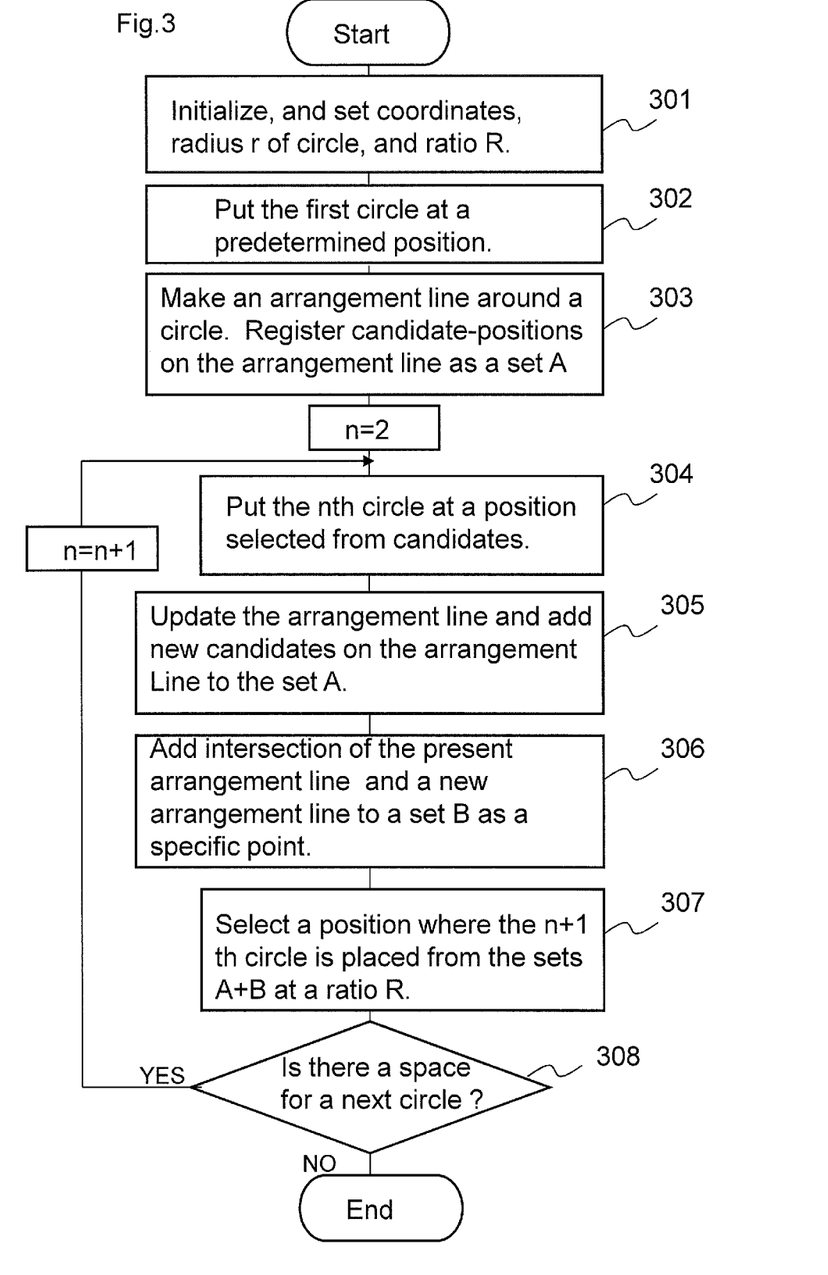
FIG. 3 is a drawing showing an example of the procedure of the method for arranging convexes of the present invention.

The aforementioned operation can be specifically performed by using a computer program. An example of specific flow of the aforementioned operation is shown in FIG. 3. First, as the initialization, a matrix is set for a predetermined area, and coordinates (x, y) of lattice points are registered. Further, the radius r of the circles to be arranged is set. Furthermore, the ratio R of convexes (circles) touching two or more convexes (circles) is set (step 301). Although roughness of the matrix is not particularly limited, it is preferred that the lattice spacing is, for example, 1/20 or less of the radius r of the circles to be arranged.

Then, center of a circle (first circle) having a radius r is arranged at a predetermined position (x1, y1), and pixel value inside the circle is made to correspond to black (step 302). The position of the starting point may be set by a user, or may be determined to be a certain lattice on the matrix in advance. Then, lattice points existing on the circle of the radius 2r (arrangement line) of which center is at the position (x1, y1) are searched, and stored as a set A of candidates of arrangement points (step 303). The centers of the second and following circles are arranged at positions (xi, yj) selected from the set A according to the predetermined selection criterion described later (step 304).

When there is already an arrangement line, i.e., when the second and following circles are arranged, a portion of the present arrangement line overlapping with a circle of the radius 2r having the center at the center of the newly arranged circle is deleted, and the outside portion of the new circle of the radius 2r is added to the existing arrangement line to update the arrangement line, as shown in FIG. 2, (b) and FIG. 2, (d). Further, lattice points existing on the updated arrangement line are searched, and added to the set A as candidates of the arrangement points (step 305). At the same time, intersections with the existing arrangement line are stored as the specific points (step 306). A set B of the specific points is a proper subset of the set A of the arrangement point candidates.

Then, coordinates at which centers of circles are arranged are selected from the set A of the arrangement point candidates and the set B of the specific points (step 307). In this selection, the coordinates are determined so that the ratio of the following coordinates selected from the set B should be an initially set value R. For example, if the ratio of coordinates selected from the set B is 1/2 (50%), during the arrangement of 2n of circles, coordinates for arrangement of n of circles are selected from the set A (except for set B), and coordinates for arrangement of n of remainder circles are selected from the set B. If the ratio is 80%, coordinates for arranging four circles out of five circles to be successively arranged are selected from the set B.

The criterion for selecting specific coordinates from the set A of the arrangement point candidates and the set B of the specific points is not particularly limited. For example, the coordinates may be selected by using random numbers and so forth, or may be selected according to an optionally determined criterion, for example, a position of which x-coordinate or y-coordinate is the closest to the position (x1, y1) is selected.

By repeating the above steps 304 to 307 until the arrangement line comes not to be seen in the set area (step 308), circles can be eventually packed without leaving gaps in which new circle can be packed.

The packing ratio of circles arranged as described above can be obtained by calculating the ratio of the blackened area based on the set area.

As described above, according to the method for arranging convexes of the present invention, the uneven pattern is not formed as a regular structure, and the packing ratio of the convexes can be made higher than the conventional packing ratio obtained by using random numbers (about fifty-odd percents at most). Therefore, it can provide remarkable effects, i.e., front luminance can be made sufficient, and generation of a moiré pattern can be prevented.

If use with a liquid crystal panel is taken into consideration, the diameter of the circular bases of the convexes constituting the uneven pattern is preferably 100 μm or smaller, more preferably 80 μm or smaller, at most. On the other hand, for enhancing light-condensing property exerted by the uneven pattern, it is preferably not smaller than 1 μm, more preferably not smaller than 3 μm, at least.

Figure 4:
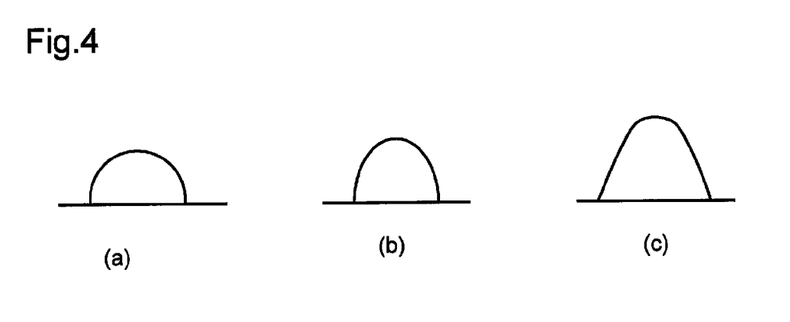

Although the shape of the convexes is not particularly limited so long as the convexes have a shape suitable for enhancing the light-condensing property to the uneven pattern side (front direction of backlight), examples include, as shown in FIG. 4, (a) to (c), a part of sphere or spheroid, a body of revolution obtained by rotating a line segment having a specific inclination as described in Japanese Patent Unexamined Publication No. 2004-280044, and so forth.

In particular, the aspect ratio of the convexes (height of convex/diameter of circular base) is preferably 0.40 to 0.70, more preferably 0.50 to 0.60, for securing higher front luminance.

Further, a plurality of the convexes preferably have both substantially the same base shapes and substantially the same perpendicular sectional shapes for producing the light control film with good precision and further enhancing light-condensing property.

In the uneven pattern, the packing ratio of the circular bases of the convexes is preferably 70 to 82% for favorably preventing generation of a moiré pattern when the film is superimposed on another member having a regular structure with securing sufficient front luminance. For the same purpose, the packing ratio of the circular bases of the convexes is more preferably 75 to 80%.

In the method for arranging convexes described above, the packing ratio can be controlled by adjusting the ratio of selecting the coordinates from the set B of the specific points.

Furthermore, for enhancing front luminance, convexes smaller than the convexes described above (large convexes) and having such a diameter of the circular base that the circular base can be filled in spaces formed between the convexes (large convexes) arranged by the method for arranging convexes of the present invention may also be arranged in the spaces. The convexes mentioned above (large convexes) are arranged without regularity, the gaps do not have regularity either, therefore even if the small convexes are arranged in the gaps, a regular arrangement is not formed, and thus the effect of preventing generation of a moiré pattern is not inhibited. Although the shape of the small convexes is not particularly limited, it is preferably a shape approximately similar to that of the convexes mentioned above (large convexes) for enhancing the light-condensing property.

Such an uneven pattern can be formed with a mold having an uneven pattern complementary to that uneven pattern. Although the method for producing a mold having an uneven pattern complementary to the uneven pattern of the present invention is not particularly limited, for example, concaves are formed on a plate by a microdrilling technique using a cutting tool having a specific sectional shape at the tip with controlling the cutting depth, and this plate is used as a mold for molding (female mold). Alternatively, concaves having a specific shape are formed on a plate by a laser microprocessing technique, and this plate is used as a mold for molding (female mold).

The light control layer preferably has a thickness of 10 to 300 µm. With a thickness of 10 µm or larger, interference pattern induced by unevenness of the thickness of the light control layer can be prevented. On the other hand, with a thickness of 300 µm or smaller, favorable handling property can be obtained. The thickness of the light control layer referred to here means a thickness from the peak of convex to the surface of the light control layer on the opposite side.

When the light control layer is formed on a support, highly transparent supports such as those consisting of a glass plate, a plastic film or the like can be used as the support. As the glass plate, plate glass produced from oxidized glass such as silicate glass, phosphate glass and borate glass can be used, and plate glass produced from silicic acid glass, or silicate glass such as alkali silicate glass, soda lime glass, potash lime glass, lead glass, barium glass and borosilicate glass is especially preferred. As the plastic film, for example, those consisting of polyethylene terephthalate, polybutylene terephthalate, polyethylene naphthalate, polycarbonate, polyethylene, polypropylene, polystyrene, triacetylcellulose, acrylic resin, polyvinyl chloride, norbornene resin and so forth can be used. Stretched, especially biaxially stretched, polyethylene terephthalate films are preferably used, because of superior mechanical strength and dimensional stability thereof. As the support, it is preferable to use those of which surfaces are subjected to an adhesion-promoting treatment such as a plasma treatment, corona discharge treatment, ultraviolet ray irradiation, and formation of undercoat adhesion-promoting layer.

Although thickness of the support is not particularly limited, and can be suitably chosen for the material used, it is generally about 25 to 500 µm, preferably about 50 to 300 µm, if handling property as the light control film and so forth are taken into consideration.

As for the method for forming the light control film provided with the light control layer of the present invention, it can be formed by a shape transfer technique, such as the 2P (Photo-Polymer) method and the embossing method. For example, a light control film provided with the light control layer on which the uneven pattern is formed can be obtained by filling such a polymer resin as described above for forming the aforementioned light control layer or the like into a mold having an uneven pattern complementary to the desired uneven pattern to carry out shape transfer, then curing the polymer resin or the like, and releasing it from the mold. When a support is used, a light control film comprising a support and the light control layer provided on the support, on which the uneven pattern is formed, can be obtained by filling a polymer resin or the like into a mold, superimposing the support thereon, then curing the polymer resin or the like, and releasing it from the mold.

Among the shape transfer techniques mentioned above, the 2P method is preferably used, because it enables production of an optical film in a relatively short period of time, and it does not require heating and cooling, i.e., it can suppress deformation of the constituent members by heat. However, from the viewpoints of high degree of freedom for selection of materials of constituent members and reduction of process cost, it is preferable to use the embossing method.

Further, the light control film can also be obtained by adding external energy to a material for forming the light control layer through a mask member that can form a predetermined uneven pattern to form the uneven pattern on the surface of the light control layer. For example, the light control film can be obtained by using a photolithography technique. That is, the light control film provided with the light control layer on which the uneven pattern is formed can also be obtained by using an ionizing radiation curable resin as a resin for constituting the light control layer, irradiating ionizing radiation on the ionizing radiation curable resin through a mask member consisting portions through which the ionizing radiation can transmit and portions through which the ionizing radiation cannot transmit to form exposed portions and unexposed portions, and then removing the ionizing radiation curable resin of the unexposed portions.

As for the method for curing the polymer resin, when the polymer resin is an ionizing radiation curable resin, it can be cured by irradiating an ionizing radiation. When the polymer resin is a thermosetting resin, it can be cured by applying heat. As the ionizing radiation, for example, a ultraviolet ray in a wavelength region of 100 to 400 nm, preferably 200 to 400 nm, emitted from an ultra high pressure mercury lamp, high pressure mercury lamp, low pressure mercury lamp, carbon arc, metal halide lamp, or the like, or an electron beam in a wavelength region of 100 nm or smaller emitted from a scanning type or curtain type electron beam accelerator can be used.

As described above, since the light control film of the present invention has an uneven pattern in which convexes having bases of approximately the same diameters are arranged by the original method, it can be a light control film that can prevent generation of a moiré pattern when the film is superimposed on another member having a regular structure, with securing sufficient front luminance. Such a light control film is preferably used for backlight devices for liquid crystal displays, illuminations, and so forth.

Hereafter, the backlight device of the present invention provided with the light control film of the present invention will be explained. The backlight device of the present invention consists of at least the light control film of the present invention and a light source. Although the direction of the light control film in the backlight device is not particularly limited, it is preferably used so that the surface having the uneven pattern should be disposed on the light-projecting surface side. For the backlight device, a configuration called edge light type or direct type is preferably employed.

A backlight device of the edge light type consists of a light guide panel, a light source disposed along at least one end of the light guide panel, the light control film of the present invention disposed on the light-projecting surface side of the light guide panel, and so forth. The light control film is preferably used so that the surface having the uneven pattern should serve as the light-projecting surface. Further, an optical member such as a prism sheet may be used between the light guide panel and the light control film.

The light guide panel has a substantially plate-like shape at least one of which sides serves as a light-entering surface and one of which surfaces perpendicular to the side serves as a light-projecting surface, and mainly consists of a matrix resin selected from highly transparent resins such as polymethyl methacrylate. Resin particles having a refractive index different from that of the matrix resin may be added as required. Each surface of the light guide panel may not be a uniform plane, but has a complicated surface profile, or may be subjected to diffusion printing for a dot pattern or the like.

The light source is disposed along at least one end of the light guide panel, and cold-cathode tubes, LED light sources etc. are mainly used. Examples of the shape of the light source include a point shape, linear shape, L-shape, and so forth.

A backlight device of the edge light type is provided with, besides the aforementioned light control film, light guide panel and light source, a light reflector, a polarization film, an electromagnetic wave shield film etc. depending on the purpose.

Figure 5:
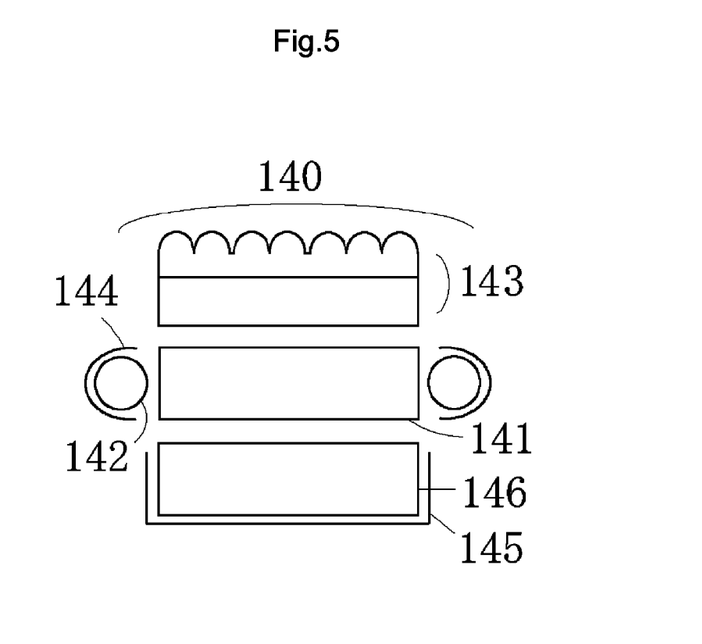
FIG. 5 shows an embodiment of the backlight device of the present invention.

One embodiment of the backlight device of the edge light type according to the present invention is shown in FIG. 5. This backlight device 140 has a configuration that light sources 142 are provided on both sides of a light guide panel 141, and a light control film 143 is placed on the upside of the light guide panel 141 so that the surface having the uneven pattern should be a surface opposite to the light guide panel. The light sources 142 are covered with light source rear reflectors 144 except for the parts facing the light guide panel 141 so that lights from the light source should efficiently enter into the light guide panel 141. Moreover, a light reflector 146 stored in a chassis 145 is provided under the light guide panel 141. By this configuration, lights projected on the side of the light guide panel 141 opposite to the projecting side are returned into the light guide panel 141 again to increase lights projected from the projection surface of the light guide panel 141.

A backlight device of the direct type consists of the light control film of the present invention, as well as a light-diffusing panel, a light source disposed in this order on a surface of the light control film opposite to the light-projecting surface, and so forth. The light control film is preferably used so that the surface having the uneven pattern should serve as the light-projecting surface. Moreover, an optical member such as a prism sheet can also be used between the light-diffusing panel and the light control film.

The light-diffusing panel is for erasing a lamp pattern of the light source, and a milky white resin plate, a transparent film on which a dot pattern is formed on a portion corresponding to the light source (lighting curtain) as well as a so-called light-diffusing film having an uneven light-diffusing layer on a transparent base material, and so forth can be used independently or in a suitable combination.

As the light source, those similar to those used for backlight devices of the edge light type mentioned above can be used. A backlight device of the direct type may be provided with, besides the aforementioned light control film, light-diffusing panel and light source, a light reflector, a polarization film, an electromagnetic wave-shielding film, etc. depending on the purpose.

Figure 6:
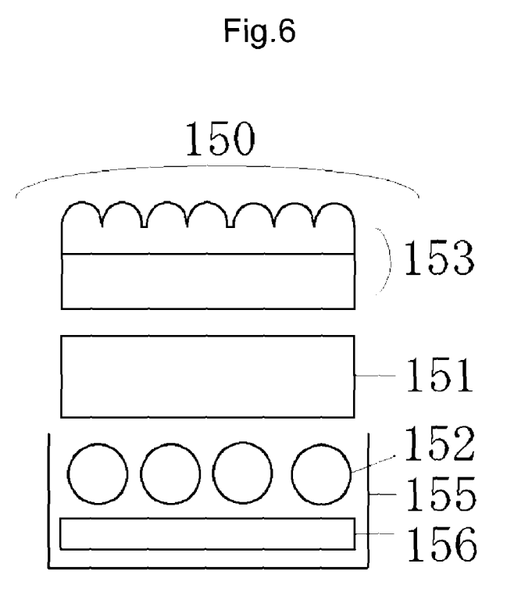
FIG. 6 shows another embodiment of the backlight device of the present invention.

One embodiment of the backlight device of the direct type according to the present invention is shown in FIG. 6. This backlight device 150 has a configuration that two or more light sources 152 are provided above a light reflector 156 stored in a chassis 155, and a light control film 153 is placed thereover via a light-diffusing panel 151 as shown in the drawing.

Because the backlight device of the present invention utilizes a light control film having a specific uneven pattern on the surface as a light control film that controls direction of lights projected from a light source or a light guide panel, it can provide superior image quality with sufficient front luminance without generating a moiré pattern even if the film is used in combination with a liquid crystal panel having a regular structure. Moreover, it does not require increase of the number of parts for improving quality of the backlight device.

EXAMPLES

Hereafter, the present invention will be further explained with reference to examples. The term "part" and symbol "%" are used on weight basis, unless especially indicated.

1. Production of Light Control Films

Example 1

A metal mold a enabling shape transfer of a specific uneven profile formed by a microdrilling technique was used. As a solution for forming light control layer, a mixture of 50 parts of an acrylic monomer (methyl methacrylate, Wako Pure Chemical Industries Ltd.), 45 parts of a polyfunctional acrylic monomer (NK Ester A-TMPT-3EO, Shin-Nakamura Chemical Co., Ltd.), and 5 parts of a photopolymerization initiator (Irgacure 184, Ciba Japan K.K.) was filled in the mold a, and a polyethylene terephthalate film having a thickness of 100 μm (COSMOSHINE A4100, Toyobo Co., Ltd.) was adhered to it as a support. Then, the light control layer was cured by ultraviolet irradiation at 600 mJ/cm$^2$ with a high pressure mercury lamp, and removed from the mold a to produce a light control film of Example 1 comprising the support and the light control layer having a thickness of 50 μm and formed on the support.

The metal mold a used in Example 1 was produced by designing an uneven pattern in which convexes having circular bases of approximately the same diameters of 50 μm were packed at a packing ratio of 80% according to the method for arranging convexes of the present invention, and forming concaves complementary to the convexes of the above uneven pattern on the surface of a metal mold material. The uneven pattern was designed so that the shape of the convexes was such a mountain shape as shown in FIG. 4, (*c*), the aspect ratio thereof was 0.60, and the ratio of the convexes arranged so that each circular base thereof should touch both circular bases of two convexes of which circular bases touch each other was 89% among the convexes.

Example 2

Figure 7:
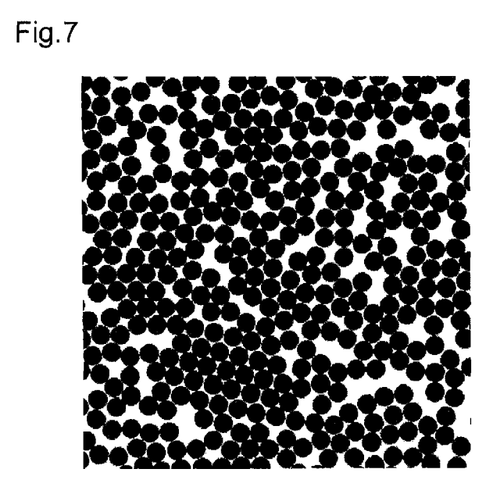
FIG. 7 shows an example of the arrangement of convexes having circular bases in an uneven pattern according to the present invention

A light control film of Example 2 was produced in the same manner as that of Example 1, except that a metal mold b enabling shape transfer of a specific uneven profile formed by a microdrilling technique was used instead of the metal mold a used in Example 1. The metal mold b used in Example 2 was produced by designing an uneven pattern in which convexes having circular bases of approximately the same diameters of 50 μm were packed at a packing ratio of 73% according to the method for arranging convexes of the present invention, and forming concaves complementary to the convexes of the above uneven pattern on the surface of a metal mold material. The uneven pattern was designed so that the shape of the convexes was such a mountain shape as shown in FIG. 4, (*c*), the aspect ratio thereof was 0.45, and the ratio of the convexes arranged so that each circular base thereof should touch both circular bases of two convexes of which circular bases touch each other was 72% among the convexes. The arrangement of the convexes in the uneven pattern designed in this example is shown in FIG. 7.

Example 3

A light control film of Example 3 was produced in the same manner as that of Example 1, except that a metal mold c enabling shape transfer of a specific uneven profile formed by a microdrilling technique was used instead of the metal mold a used in Example 1. The metal mold c used in Example 3 was produced by designing an uneven pattern in which convexes having circular bases of approximately the same diameters of 50 μm were packed at a packing ratio of 70% according to the method for arranging convexes of the present invention, and forming concaves complementary to the convexes of the above uneven pattern on the surface of a metal mold material. The uneven pattern was designed so that the shape of the convexes was such a mountain shape as shown in FIG. 4, (*c*), the aspect ratio thereof was 0.50, and the ratio of the convexes arranged so that each circular base thereof should touch both circular bases of two convexes of which circular bases touch each other was 57% among the convexes.

Example 4

A metal mold d enabling shape transfer of a specific uneven profile formed by a microdrilling technique was used, and the same solution for forming light control layer as that of Example 1 was filled in the metal mold d. Then, the light control layer was cured by ultraviolet irradiation at 600 mJ/cm$^2$ with a high pressure mercury lamp, and removed from the mold d to produce a light control film of Example 4 consisting of the light control layer having a thickness of 70 μm. The metal mold d used in Example 4 was produced by designing an uneven pattern in which convexes having circular bases of approximately the same diameters of 50 μm were packed at a packing ratio of 75% according to the method for arranging convexes of the present invention, and forming concaves complementary to the convexes of the above uneven pattern on the surface of a metal mold material. The uneven pattern was designed so that the shape of the convexes was such a mountain shape as shown in FIG. 4, (*c*), the aspect ratio thereof was 0.35, and the ratio of the convexes arranged so that each circular base thereof should touch both circular bases of two convexes of which circular bases touch each other was 79% among the convexes.

Example 5

A light control film of Example 5 was produced in the same manner as that of Example 4, except that a metal mold e enabling shape transfer of a specific uneven profile formed by a microdrilling technique was used instead of the metal mold d used in Example 4. The metal mold e used in Example 5 was produced by designing an uneven pattern in which convexes having circular bases of approximately the same diameters of 50 μm were packed at a packing ratio of 69% according to the method for arranging convexes of the present invention, and forming concaves complementary to the convexes of the above uneven pattern on the surface of a metal mold material. The uneven pattern was designed so that the shape of the convexes was such a mountain shape as shown in FIG. 4, (*c*), the aspect ratio thereof was 0.55, and the ratio of the convexes arranged so that each circular base thereof should touch both circular bases of two convexes of which circular bases touch each other was 51% among the convexes.

Example 6

A light control film comprising a polyethylene naphthalate film having a thickness of 188 μm (Teonex Q51, Teijin DuPont Films Japan Limited) as the support and a shape-transferred light control layer having a thickness of 35 μm formed on the support by using an injection molding machine was produced under the conditions of a cylinder temperature: 280° C. and a metal mold temperature: 85° C. The light control layer was formed from pellets of a polycarbonate resin (Panlite L-1225, Teijin Chemicals Ltd.) as the polymer resin. As the mold, a metal mold f enabling shape transfer of a specific uneven profile formed by a microdrilling technique was used. The metal mold f used in Example 6 was produced by designing an uneven pattern in which convexes having circular bases of approximately the same diameters of 50 μm were packed at a packing ratio of 76% according to the method for arranging convexes of the present invention, and forming concaves complementary to the convexes of the above uneven pattern on the surface of a metal mold material. The uneven pattern was designed so that the shape of the convexes was such a mountain shape as shown in FIG. 4, (*c*), the aspect ratio thereof was 0.50, and the ratio of the convexes arranged so that each circular base thereof should touch both circular bases of two convexes of which circular bases touch each other was 83% among the convexes.

Example 7

A light control film of Example 7 was produced in the same manner as that of Example 6, except that a metal mold g enabling shape transfer of a specific uneven profile formed by a microdrilling technique was used instead of the metal mold f used in Example 6. The metal mold g used in Example 7 was produced by designing an uneven pattern in which convexes having circular bases of approximately the same diameters of 50 μm were packed at a packing ratio of 72% according to the method for arranging convexes of the present invention, and forming concaves complementary to the convexes of the above uneven pattern on the surface of a metal mold material. The uneven pattern was designed so that the shape of the convexes was such a mountain shape as shown in FIG. 4, (c), the aspect ratio thereof was 0.65, and the ratio of the convexes arranged so that each circular base thereof should touch both circular bases of two convexes of which circular bases touch each other was 68% among the convexes.

Example 8

A light control film of Example 8 was produced in the same manner as that of Example 6, except that a metal mold h enabling shape transfer of a specific uneven profile formed by a microdrilling technique was used instead of the metal mold f used in Example 6. The metal mold h used in Example 8 was produced by designing an uneven pattern in which convexes having circular bases of approximately the same diameters of 50 μm were packed at a packing ratio of 81% according to the method for arranging convexes of the present invention, and forming concaves complementary to the convexes of the above uneven pattern on the surface of a metal mold material. The uneven pattern was designed so that the shape of the convexes was such a mountain shape as shown in FIG. 4, (c), the aspect ratio thereof was 0.60, and the ratio of the convexes arranged so that each circular base thereof should touch both circular bases of two convexes of which circular bases touch each other was 90% among the convexes.

Example 9

A light control film consisting of a light control layer having a thickness of 30 μm was produced by using an injection molding machine under the conditions of a cylinder temperature: 280° C. and a metal mold temperature: 85° C. The light control layer was formed from pellets of a polycarbonate resin (Panlite L-1225, Teijin Chemicals Ltd.) as the polymer resin. As the mold, a metal mold i enabling shape transfer of a specific uneven profile formed by a microdrilling technique was used. The metal mold i used in Example 9 was produced by designing an uneven pattern in which convexes having circular bases of approximately the same diameters of 50 μm were packed at a packing ratio of 78% according to the method for arranging convexes of the present invention, and forming concaves complementary to the convexes of the above uneven pattern on the surface of a metal mold material. The uneven pattern was designed so that the shape of the convexes was such a mountain shape as shown in FIG. 4, (c), the aspect ratio thereof was 0.75, and the ratio of the convexes arranged so that each circular base thereof should touch both circular bases of two convexes of which circular bases touch each other was 87% among the convexes.

Example 10

A light control film of Example 10 was produced in the same manner as that of Example 9, except that a metal mold j enabling shape transfer of a specific uneven profile formed by a microdrilling technique was used instead of the metal mold i used in Example 9. The metal mold j used in Example 10 was produced by designing an uneven pattern in which convexes having circular bases of approximately the same diameters of 50 μm were packed at a packing ratio of 83% according to the method for arranging convexes of the present invention, and forming concaves complementary to the convexes of the above uneven pattern on the surface of a metal mold material. The uneven pattern was designed so that the shape of the convexes was such a mountain shape as shown in FIG. 4, (c), the aspect ratio thereof was 0.50, and the ratio of the convexes arranged so that each circular base thereof should touch both circular bases of two convexes of which circular bases touch each other was 92% among the convexes.

When the arrangements of the convexes of the uneven patterns formed on the light control layer surfaces of the light control films of Examples 1 to 10 were examined, the arrangements satisfied the definition of the arrangement of convexes of the present invention in all the uneven patterns. That is, the convexes were arranged so as to satisfy the following relationship: when the first convex was arbitrarily selected, the second convex was arranged so that the circular base thereof should touch the circular base of the first convex as the basis without overlapping with the same, then the third convex was arranged so that the circular base thereof should touch the circular base of the first convex or the second convex without overlapping with both the circular bases of the first convex or the second convex, and the following n-th convex was arranged so that the circular base thereof should touch any of the circular bases of the first to (n−1)th convexes without overlapping with all the circular bases of the first to (n−1)th convexes. Further, the ratios of the convexes arranged so that each circular base thereof should touch circular bases of two convexes of which circular bases touch each other were 50 to 92% among the convexes of the uneven patterns.

Comparative Example 1

A light control film of Comparative Example 1 was produced in the same manner as that of Example 1, except that a metal mold k enabling shape transfer of a specific uneven profile formed by a microdrilling technique was used instead of the metal mold a used in Example 1. The metal mold k used in Comparative Example 1 was designed so that it could make shape transfer of an uneven pattern in which convexes having circular bases of approximately the same diameters of 50 μm and approximately the same shapes showing an aspect ratio of 0.50 were packed in the state of the closest packing (packing ratio: 91%) without overlapping with one another. Since the metal mold k was designed to realize the closest packing of the convexes, the convexes were arranged on the light control layer surface of the light control film produced with the metal mold k so that circular bases of all the convexes of the uneven pattern each should touch both circular bases of two convexes of which circular bases touch each other.

Comparative Example 2

A light control film of Comparative Example 2 was produced in the same manner as that of Example 1, except that a metal mold l enabling shape transfer of a specific uneven profile formed by a microdrilling technique was used instead of the metal mold a used in Example 1. The metal mold l used in Comparative Example 2 was produced by designing an uneven pattern in which convexes having circular bases of approximately the same diameters of 50 μm and approximately the same shapes showing an aspect ratio of was 0.60 were randomly arranged by using random numbers so that the circular bases should not overlap with one another, and producing the mold so that it could make shape transfer of the above uneven pattern. In the uneven pattern produced with this metal mold, the ratio of the convexes arranged so that each circular base thereof should touch both circular bases of two convexes of which circular bases touch each other was not higher than 0.1%. Further, the packing ratio of the circular bases of the convexes was 54%.

Comparative Example 3

A light control film of Comparative Example 3 was produced in the same manner as that of Example 6, except that a metal mold m enabling shape transfer of a specific uneven profile formed by a microdrilling technique was used instead of the metal mold f used in Example 6. The metal mold m used in Comparative Example 3 was designed so that it could make shape transfer of an uneven pattern in which convexes having circular bases of approximately the same diameters of 50 μm and approximately the same shapes showing an aspect ratio of 0.50 were packed at a packing ratio of 63% according to the method for arranging convexes of the present invention.

When the arrangement of the convexes of the uneven pattern formed on the light control layer surface of the light control film of Comparative Example 3 was examined, the arrangement satisfied the definition of the arrangement of convexes of the present invention. That is, the convexes were arranged so as to satisfy the following relationship: when the first convex was arbitrarily selected, the second convex was arranged so that the circular base thereof should touch the circular base of the first convex as the basis without overlapping with the same, then the third convex was arranged so that the circular base thereof should touch the circular base of the first convex or the second convex without overlapping with both the circular bases of the first convex or the second convex, and the following n-th convex was arranged so that the circular base thereof should touch any of the circular bases of the first to (n−1)th convexes without overlapping with all the circular bases of the first to (n−1)th convexes. However, the ratio of the convexes arranged so that each circular base thereof should touch circular bases of two convexes of which circular bases touch each other was 10% among the convexes of the uneven pattern.

2. Production of Backlight Devices

Then, 15-inch edge light type backlight devices (one cold-cathode tube was provided for each of upside and downside) constituted by disposing each of the light control films of Examples 1 to 10 and Comparative Examples 1 to 3 on a light guide panel were produced as backlight devices of Examples 1 to 10 and Comparative Examples 1 to 3.

3. Evaluation (1) Front Luminance

Front luminance of the edge light type backlight devices using the light control films of Examples 1 to 10 and Comparative Examples 1 to 3 was measured at the center of the light-projecting surfaces. As for the direction of the light control films, they were used so that the surfaces having an uneven pattern should be light-projecting surfaces. The measurement results are shown in Table 1 (unit is "cd/m$^2$"). Front luminance of the edge light type backlight device with no light control film was 1000 cd/m$^2$.

(2) Generation of Moiré Pattern

The liquid crystal displays using the light control films of Examples 1 to 10 and Comparative Examples 1 to 3, respectively, were turned on with all white display in a darkroom, and generation of moiré pattern was observed by visual inspection viewing from the front direction and an oblique direction. The result that no moiré pattern was generated is indicated with the symbol "○", the result that a moiré pattern was slightly generated, but was hardly seen by visual inspection is indicated with the symbol "◉", the result that a moiré pattern was generated, but did not affect visibility is shown with the symbol "Δ", and the result that a moiré pattern was generated, and greatly affected visibility is shown with the symbol "X". The evaluation results are shown in Table 1.

TABLE 1

|  | Front luminance (cd/m$^2$) | Moiré pattern | Ratio of touching of convexes (%) | Packing ratio (%) |
|---|---|---|---|---|
| Example 1 | 2120 | ◉ | 89 | 80 |
| Example 2 | 1890 | ◉ | 72 | 73 |
| Example 3 | 1850 | ◉ | 57 | 70 |
| Example 4 | 1800 | ◉ | 79 | 75 |
| Example 5 | 1830 | ◉ | 51 | 69 |
| Example 6 | 2000 | ◉ | 83 | 76 |
| Example 7 | 1910 | ◉ | 68 | 72 |
| Example 8 | 2150 | ○ | 90 | 81 |
| Example 9 | 1840 | ◉ | 87 | 78 |
| Example 10 | 2190 | Δ | 92 | 83 |
| Comparative Example 1 | 2400 | X | 100 | 91 |
| Comparative Example 2 | 1410 | ◉ | Not higher than 0.1 | 54 |
| Comparative Example 3 | 1660 | ◉ | 10 | 63 |

The "Ratio of touching of convexes" in Table 1 means the ratio of convexes arranged so that the circular bases thereof each should touch circular bases of two convexes of which circular bases touch each other among the convexes of the uneven patterns provided on the light control layer surfaces of the light control films of Examples 1 to 10 and Comparative Examples 1 to 3.

As clearly seen from the results shown in Table 1, since the light control films of Examples 1 to 10 had a light control layer provided with an uneven pattern in which convexes having bases of approximately same diameters were arranged by the original method on the surface, the packing ratio of the convexes could be made high, and sufficient front luminance could be secured. Further, the light control films of Examples 1 to 10 did not generate a moiré pattern even when they were used by superimposing them on a liquid crystal panel having a regular structure, and did not degrade the image quality of the liquid crystal display.

In particular, in the light control films of Examples 1 to 3 and 6 to 8, the aspect ratios of the convexes constituting the uneven patterns of the light control layer surfaces were 0.40 to 0.70, and the packing ratio of the convexes was in the range of 70 to 82%. Therefore, they showed superior balance of front luminance and moiré pattern-preventing property.

In the light control films of Examples 1 and 6, the aspect ratios of the convexes constituting the uneven patterns of the light control layer surfaces were 0.50 to 0.60, and the packing ratios of the convexes were in the range of 75 to 80%. Therefore, they showed particularly superior balance of front luminance and moiré pattern-preventing property.

Further, since the backlight devices of Examples 1 to 10 incorporated with the light control films of Examples 1 to 10 used light control films which did not generate moiré pattern with securing sufficient front luminance, they did not degrade image quality as described above. Moreover, since they did not require additional optical sheet for securing front luminance, they can be constituted with a fewer number of parts.

On the other hand, the light control film of Comparative Example 1 had a light control layer provided with an uneven pattern in which convexes having bases of approximately the same diameters were arranged in the state of the closest packing without leaving spaces so that the circular bases should not overlap with one another, unlike the uneven pattern formed by the method for arranging convexes of the present invention. Therefore, the light control film of Comparative Example 1 showed superior front luminance, but when the film was used by being superimposed on a liquid crystal panel having a regular structure, it generated a moiré pattern, and degraded the image quality of the liquid crystal display.

The light control film of Comparative Example 2 had a light control layer provided with an uneven pattern in which convexes having bases of approximately the same diameters were randomly arranged by using random numbers, which was not the uneven pattern formed by the method for arranging convexes of the present invention. Therefore, when the light control film of Comparative Example 2 was used by being superimposed on a liquid crystal panel having a regular structure, the film did not generate a moirépattern, and did not degrade the image quality of the liquid crystal display. However, in the light control film of Comparative Example 2, substantially all the convexes of the uneven pattern on the light control layer surface were not arranged so that each circular base thereof should touch both circular bases of two convexes of which circular bases touch each other (the ratio was not higher than 0.1%), thus the packing ratio of the convexes was low, and therefore it provided poor front luminance.

Further, the light control film of Comparative Example 3 had a light-diffusing layer provided with an uneven pattern in which convexes were arranged by a method similar to the method for arranging convexes of the present invention, but the ratio of convexes arranged so that each circular base thereof should touch both circular bases of two convexes of which circular bases touch each other was 10%. Therefore, although it did not generate moiré pattern, it provided poor front luminance.

Further, since the backlight devices of Comparative Examples 1 to 3 used the light control films of Comparative Examples 1 to 3 showing poor balance of front luminance and moiré pattern-preventing property, they showed poor quality as backlight devices.

BRIEF DESCRIPTION OF THE DRAWINGS

FIG. 4, (a) to (c) are drawings showing examples of the shape of convex.

DESCRIPTION OF NUMERICAL NOTATIONS

A, B, C, D . . . . Circular bases of convexes
140, 150 . . . . Backlight device
141, 151 . . . . Light guide plate or light-diffusing panel
142, 152 . . . . Light source
143, 153 . . . . Light control film

The invention claimed is:

1. A light control film having a light control layer provided with an uneven pattern in which convexes having circular bases of approximately the same diameters are arranged on a surface, wherein:

the uneven pattern has an arrangement where, for first to n-th convexes (n is an integer of 2 or larger) successively arranged, circular base of the n-th convex should touch any of circular bases of the first to (n−1)th convexes without overlapping with the circular bases of all the first to (n−1)th convexes, and ratio of convexes arranged so that each of circular bases thereof should touch both circular bases of two convexes of which circular bases touch each other is 50 to 92% among the convexes.

2. The light control film according to claim 1, wherein ratio of convexes arranged so that each of the circular bases thereof should touch circular bases of two or more convexes is 80% or more and 100% or less among the convexes.

3. The light control film according to claim 2, wherein the convexes have approximately the same shapes.

4. The light control film according to claim 1, wherein the convexes have approximately the same shapes.

5. The light control film according to claim 1, wherein packing ratio of the circular bases of the convexes in the uneven pattern is 70 to 82%.

6. The light control film according to claim 1, wherein the convexes have an aspect ratio of 0.40 to 0.70.

7. The light control film according to claim 1, wherein the light control layer is constituted with a polymer resin.

8. A backlight device comprising a light source, a plate-shaped optical member for projecting light entered from the light source from a surface other than a light-entering surface, and a light control film disposed adjacent to the plate-shaped optical member, wherein the light control film according to claim 1 is used as the light control film.

9. A method for producing a mold for forming the uneven pattern in the light control film of claim 1 having the light control layer provided with the uneven pattern on the surface, which comprises:

the step of arranging circles corresponding to bases of the plurality of convexes having circular bases of approximately the same diameters on a surface of a mold material, and the step of forming concaves serving as a female mold of the convexes inside the circles arranged, wherein:

in the step of arranging circles, steps of successively arranging first to n-th circles (n is an integer of 2 or larger) are carried out until it becomes impossible to find a space for placing a circle without overlapping with other circles on the surface of the mold material, a circle to be arranged as the n-th circle is arranged so as to touch any of the first to (n−1)th circles without overlapping with all the first to (n−1)th circles, and ratio of circles arranged at such positions that each of the circles should touch both two circles touching each other is controlled to be 50 to 92%.

10. A light control film having a light control layer provided with an uneven pattern on a surface, wherein the uneven pattern is formed by arranging a plurality of first convexes having circular bases of approximately the same diameters and second convexes having circular bases of a diameter smaller than that of the first convexes, a plurality of the first convexes are arranged so that circular bases thereof should not overlap with one another, and each should touch circular base or bases of one or more other first convexes, and among a plurality of the first convexes, ratio of convexes arranged so that each of circular bases thereof should touch both circular bases of two first convexes of which circular bases touch each other is 50 to 92%.

11. A backlight device comprising a light source, a plate-shaped optical member for projecting light entered from the light source from a surface other than a light-entering surface, and a light control film disposed adjacent to the plate-shaped optical member, wherein the light control film according to claim 10 is used as the light control film.

12. A light control film having a light control layer provided with an uneven pattern in which a plurality of convexes having circular bases of approximately the same diameters are arranged on a surface, wherein:

a plurality of the convexes are arranged so that circular bases thereof should not overlap with one another, and each should touch circular base or bases of one or more other convexes, and ratio of convexes arranged so that each of circular bases thereof should touch circular bases of two or more convexes is 80% or more and less than 100% among a plurality of the convexes.

13. A backlight device comprising a light source, a plate-shaped optical member for projecting light entered from the light source from a surface other than a light-entering surface, and a light control film disposed adjacent to the plate-shaped optical member, wherein the light control film according to claim 12 is used as the light control film.

\* \* \* \* \*